(12) United States Patent
Schmidt et al.

(10) Patent No.: US 9,065,705 B2
(45) Date of Patent: *Jun. 23, 2015

(54) MULTIPLEXER FOR MULTI-TENANT ARCHITECTURES

(71) Applicants: Joerg Schmidt, Sinsheim (DE); Karolin Laicher, Rauenberg (DE); Rainer Leinemann, Sandhausen (DE); Andres Willi Rueegg, Zurich (CH); Thomas Vogt, Neustadt (DE)

(72) Inventors: Joerg Schmidt, Sinsheim (DE); Karolin Laicher, Rauenberg (DE); Rainer Leinemann, Sandhausen (DE); Andres Willi Rueegg, Zurich (CH); Thomas Vogt, Neustadt (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/908,947

(22) Filed: Jun. 3, 2013

(65) Prior Publication Data

US 2013/0262689 A1 Oct. 3, 2013

Related U.S. Application Data

(63) Continuation of application No. 12/847,919, filed on Jul. 30, 2010, now Pat. No. 8,458,346.

(51) Int. Cl.
*H04L 29/08* (2006.01)
*H04L 29/06* (2006.01)
*G06F 9/50* (2006.01)
*G06F 9/445* (2006.01)

(52) U.S. Cl.
CPC .... *H04L 29/08576* (2013.01); *H04L 29/06326* (2013.01); *H04L 29/08306* (2013.01); *H04L 67/14* (2013.01); *H04L 29/06551* (2013.01); *G06F 8/65* (2013.01); *G06F 9/5072* (2013.01)

(58) Field of Classification Search
CPC ............ H04L 29/06326; H04L 29/08576; H04L 29/08306; H04L 29/06551; H04L 67/14
USPC .............. 709/229, 223, 219, 225; 705/34; 713/170, 171, 168; 714/37; 370/260; 726/3
See application file for complete search history.

(56) References Cited

U.S. PATENT DOCUMENTS

| | | | |
|---|---|---|---|
| 2007/0022469 A1* | 1/2007 | Cooper et al. | 726/3 |
| 2008/0301445 A1* | 12/2008 | Vasic et al. | 713/171 |
| 2010/0165887 A1* | 7/2010 | Ristock et al. | 370/260 |
| 2010/0211782 A1* | 8/2010 | Auradkar et al. | 713/168 |
| 2011/0016322 A1* | 1/2011 | Dean et al. | 713/171 |
| 2011/0060947 A1* | 3/2011 | Song et al. | 714/37 |
| 2011/0145580 A1* | 6/2011 | Auradkar et al. | 713/170 |
| 2011/0251937 A1* | 10/2011 | Falk et al. | 705/34 |

* cited by examiner

*Primary Examiner* — Le H Luu
(74) *Attorney, Agent, or Firm* — Mintz Levin Cohn Ferris Glovsky and Popeo, P.C.

(57) ABSTRACT

A tenant multiplexer in an administrative tenant of a multi-tenant software architecture can call an administrative agent in the administrative tenant and receive, from the administrative agent, an action framework and a trusted connection protocol for accessing each of the plurality of client tenants. The trusted connection protocol can establish, without tenant-specific authentication information, a trusted system connection to an update agent in each of the plurality of client tenants. An action framework can be simultaneously implemented using the update agent of each of at least a subset of the plurality of client tenants under control of the multiplexer via the trusted system connection to begin execution of the software process for the at least the subset of client tenants.

20 Claims, 6 Drawing Sheets

MULTIPLEXER FOR MULTI-TENANT ARCHITECTURES

TECHNICAL FIELD

The subject matter described herein relates to a multiplexer that can be used in some implementations to propagate software updates, changes, and the like across a multi-tenant software architecture.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a computer-implemented method includes receiving input data specifying a software process to an administrative tenant in a multi-tenant system that comprises at least one processor, an application server implemented on the at least one processor, and a data repository. The application server provides access for each of a plurality of organizations to one of a plurality of client tenants. A tenant multiplexer initiated in the administrative tenant calls an administrative agent in the administrative tenant and receives, from the administrative agent, an action framework and a trusted connection protocol for accessing each of the plurality of client tenants. A trusted system connection to an update agent in each of the plurality of client tenants is established using the trusted connection protocol without tenant-specific authentication information. Using the update agent of each of at least a subset of the plurality of client tenants under control of the multiplexer via the trusted system connection, the action framework is simultaneously implemented to begin execution of the software process for the at least the subset.

In some variations one or more of the following can optionally be included. Each of the plurality of client tenants can include a customizable, organization-specific version of a core software platform. The data repository can include core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants. The action framework can include a change to at least one of the core software platform content and the format of the system content. A dependency-driven modification to at least one of the system content data, the tenant-specific content formats, or the tenant-specific content data for the at least one of the plurality of client tenants can be propagated for at least one of the plurality of client tenants. The dependency-driven modification can result from the modification of at least one of the core software platform content and the format of the system content. The dependency-driven modification can be identified by accessing a listing of dependencies stored in a dependency repository accessible to the application server. The action framework can include at least one of a report to be executed for at least a subset of the plurality of client tenants and a batch job whose execution is supervised by a monitoring program in the administrative tenant.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, a standardized procedure can be provided for applying updates and corrections to a multi-tenant software delivery system. Updates, corrections, and other aspects of lifecycle management of the core software package can be performed using a common, standardized process pattern. Additionally, reports and other actions that need to be applied to all or a subset of the client tenants in a system can be implemented simultaneously without requiring individual log-ins to each of the affected client tenants.

It should be noted that, while the descriptions of specific implementations of the current subject matter discuss delivery of enterprise resource planning software to multiple organizations via a multi-tenant system, the current subject matter is applicable to other types of software and data services access as well. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade or update, many application specific tasks may have to be executed in a multi-tenant system. One or more of these actions have to run on every business tenant that exists in the multi-tenant system. However, to start a task on a specific tenant, a user logon with password can be necessary, thereby requiring that the lifecycle management procedure have ready access to authentication information, such as for example user names and passwords, for each tenant. Such a requirement can create numerous disadvantages, including but not limited to security concerns, logistical difficulties pertaining to maintaining a current listing of authentication information for numerous tenants, and the like.

To address these and potentially other issues, one or more implementations of the current subject matter provide methods, systems, articles or manufacture, and the like that can, among other possible advantages, provide improved and streamlined procedures for enacting changes, updates, and the like to multi-tenant software delivery architectures.

Figure 1:
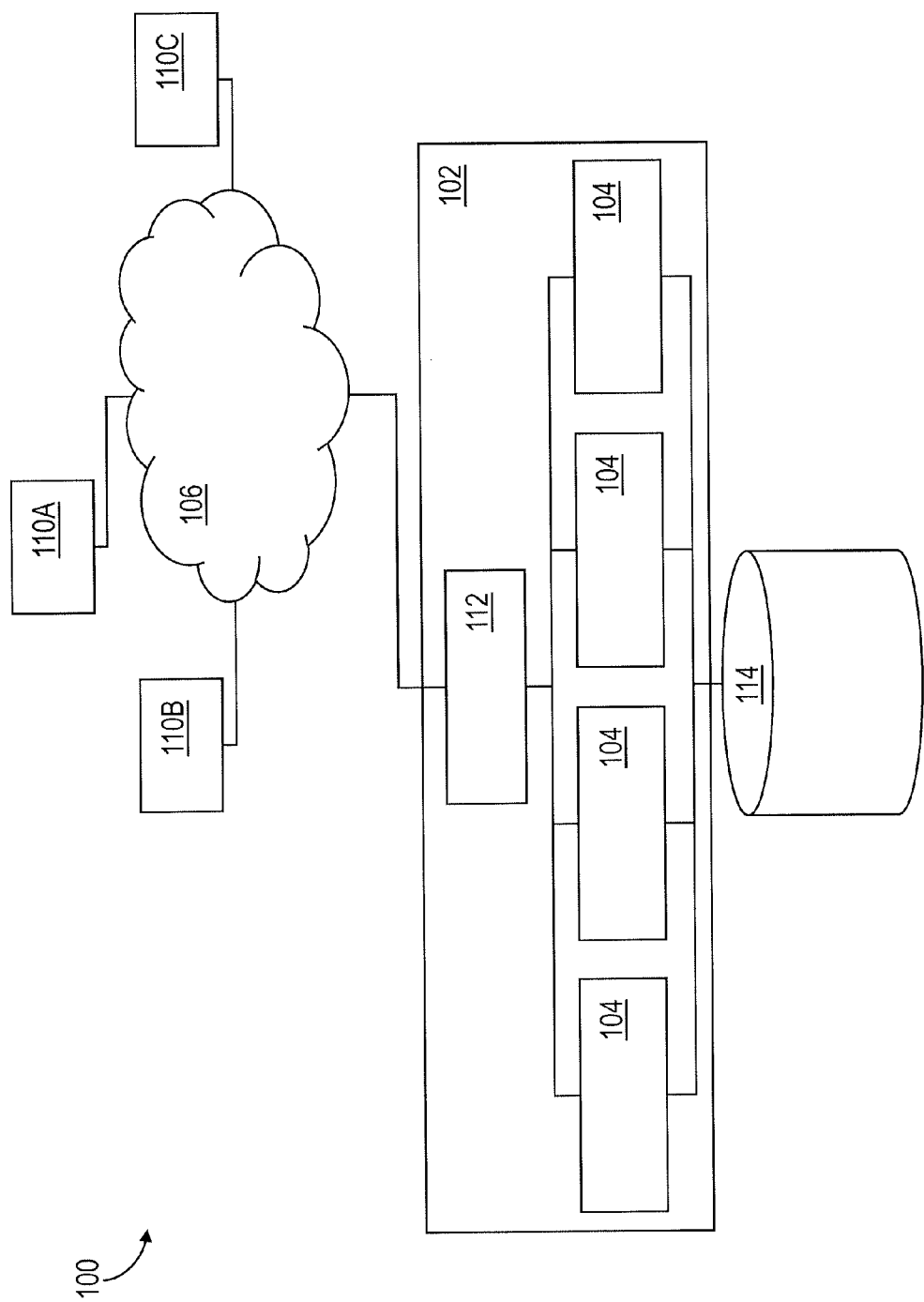
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
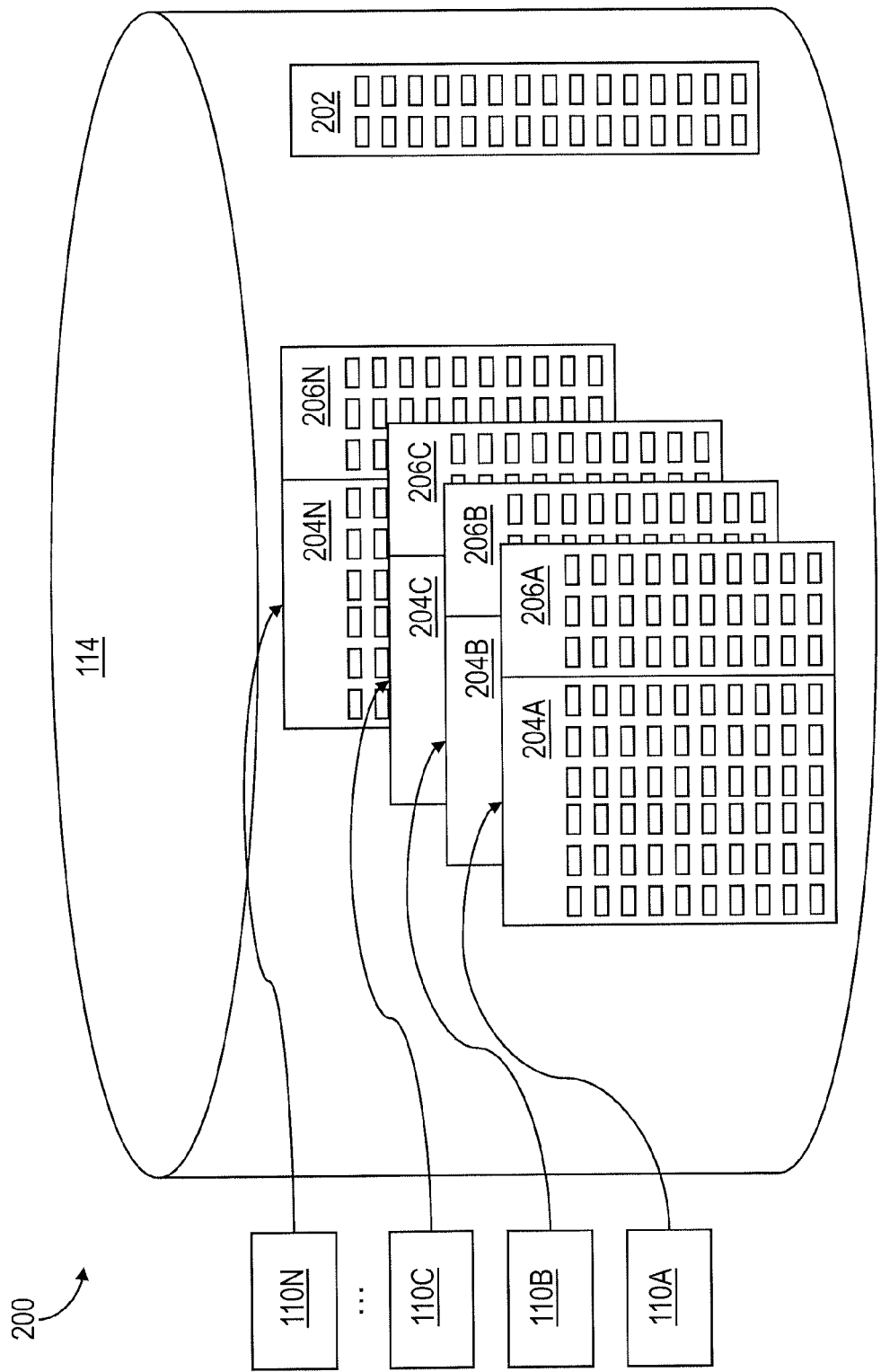
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an ERP system that includes inventory tracking functionality, the system content 204A-204N can include data objects for labeling and quantifying inventory. The data retained in these data objects are tenant-specific: for example, each tenant 110A-110N stores information about its own inventory. Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

Figure 3:
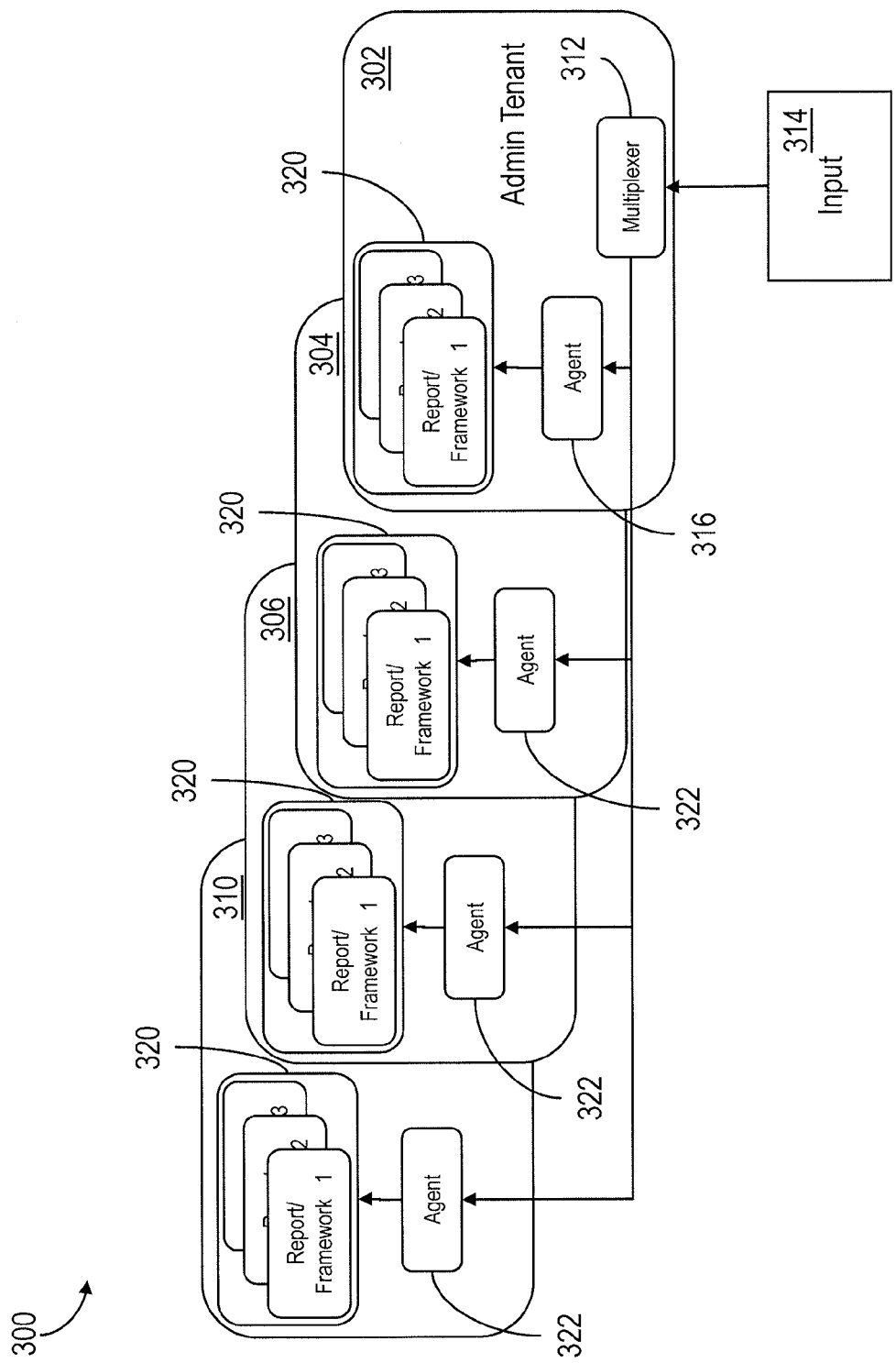
FIG. 3 is a diagram showing operation of a tenant multiplexer.

FIG. 3 shows a box diagram 300 of multiple tenants in a multi-tenant software architecture, such as that show in FIG. 1 and FIG. 2. An administrative tenant 302 is included in the software architecture along with the plurality of client tenants 304, 306, and 310. It should be readily understood that while FIG. 3 shows 3 client tenants, this should not be construed as limiting the actual number of tenants in a system consistent with an implementation of the current subject matter. A tenant multiplexer 312 at the administrative tenant 302 receives input 314, for example instructions for software upgrades, a report format to be run for each tenant in the multi-tenant software architecture, or the like. The input 314 can specify that the required operations are to be processed for all tenants (both administrative and customer), for the administrative tenant 302 and some subset of the client tenants, or for only the administrative tenant. The multiplexer can then call an administrative tenant agent 316, which calls one or more of a set 320 of reports, modification frameworks, or other procedures or architectures for implementing the operations required by the input 314. If the input 314 specifies that all or some subset of the client tenants are to be operated upon, the multiplexer 312 accesses the designated client tenants via a trusted connection that does not require use of normal authentication procedures like user names and passwords. In one example, the multiplexer accesses the designated client tenants via a remote function call (RFC). Via the trusted connection, the multiplexer passes the set 320 of reports, modification frameworks, or other procedures or architectures (also referred to collectively herein as "action frameworks") for implementing the operations required by the input 314 to a tenant agent 322 at each client tenant. The tenant agents 322 for each client tenant can be controlled remotely via the multiplexer to simultaneously implement the action framework 320 on each client tenant.

Figure 4:
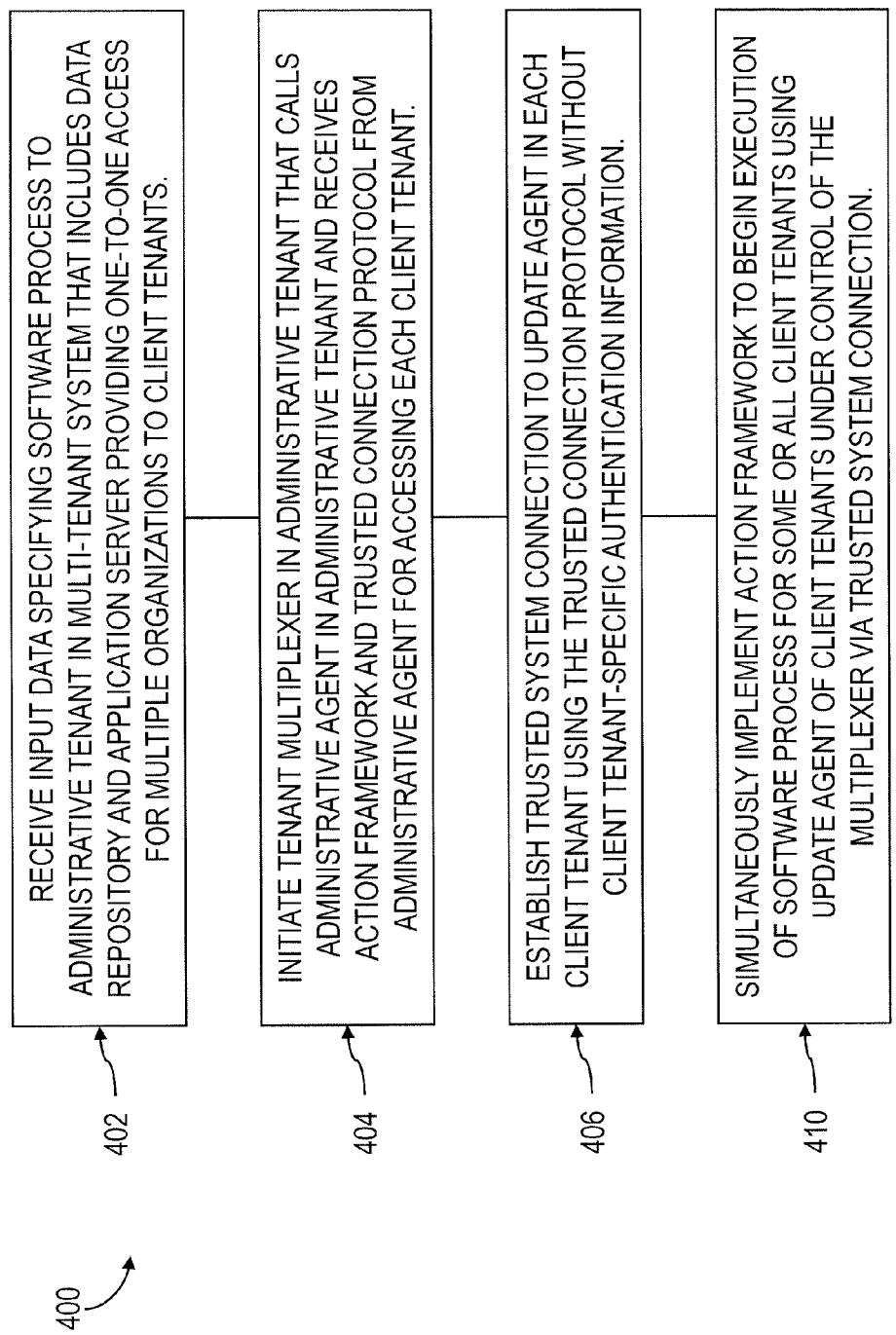
FIG. 4 is a process flow diagram illustrating a method.

FIG. 4 shows a process flow chart 400 illustrating a method consistent with implementations of the current subject matter. At 402, input data specifying a software process are received to or at an administrative tenant in a multi-tenant system. The multi-tenant system can be one as described herein that includes a data repository and an application server that provides access for each of a plurality of organizations to one of a plurality of client tenants. At 404, a tenant multiplexer is initiated in the administrative tenant. The tenant multiplexer calls an administrative agent in the administrative tenant and receives, from the administrative agent, an action framework and a trusted connection protocol for accessing each of the plurality of client tenants. Using the trusted connection protocol without tenant-specific authentication information, at 406 a trusted system connection is established to an update agent in each of the plurality of client tenants. At 410, the action framework is simultaneously implemented using the update agent of each of at least a subset of the plurality of client tenants under control of the multiplexer via the trusted system connection. Implementation of the action framework begins execution of the software process for the at least the subset of the plurality of client tenants.

In one example of the implementation shown in FIG. 4, the action framework can include a batch job for each client tenant that specifies every action to be performed in that client tenant. A monitor program in the administrative tenant can supervise execution of the batch jobs. A trusted connection can in some examples be a remote function call (RFC) connection that allows only specific users access from the administrative tenant. In this manner, the multiplexer 312 can use client tenant definitions, for example of a data model specific to each client tenant, and need not have access to authentication information (for example user names and passwords) for each individual client tenant.

Instead, tenant-specific protocols can be merged into a single phase protocol. Accordingly, in some implementations of the current subject matter, the action framework can include a report that is to be run on each client tenant of a multi-tenant system. The report execution can be monitored, and resulting protocols can be merged.

Alternatively or in addition, the action framework can include one or more updates, changes, hot fixes, or the like (hereinafter referred to as "updates") to any aspect of the provided software solution or to the infrastructures supporting delivery of the software solution can require that access to the software solution by end users be suspended for a period of time that is commonly referred to as downtime. Minimization of downtime is very desirable in nearly any software installation, especially if the software provides one or more business critical functions. When updates are required, they are often scheduled for times when the downtime will have the smallest possible impact on the organization, for example over a weekend, at night, or during some other period when as few as possible users associated with the organization are expected to be attempting to access software features or data. The downtime required for an update generally varies depending on the content of the update, and in a multi-tenant system can also depend strongly upon dependencies between core software platform content 202, system content 204, and tenant content 206. As an example, applying an update for a client tenant whose installation includes numerous and complicated customizations and extensions that depend upon a large number of core software data objects and the like can require substantially longer downtime than a similar software change, update, or correction for a client tenant whose installation lacks as much complexity and interdependency on standard data objects of the core software package.

Infrastructures that might need to be updated can include meta data repository frameworks, such as for example MDRS and xRepository. Both a meta data repository framework as well as the contents of such a framework can be fully integrated into design time. Changes can be delivered as part of a main interface software component, that can in some implementations be provided in the advanced business application programming (ABAP) language, as is for example Business ByDesign™ available from SAP AG (Walldorf, Germany). Such changes can be applied using one or more software deployment tools, such as a support package manager (SPAM), which can in some examples be implemented in an ABAP environment.

Figure 5:
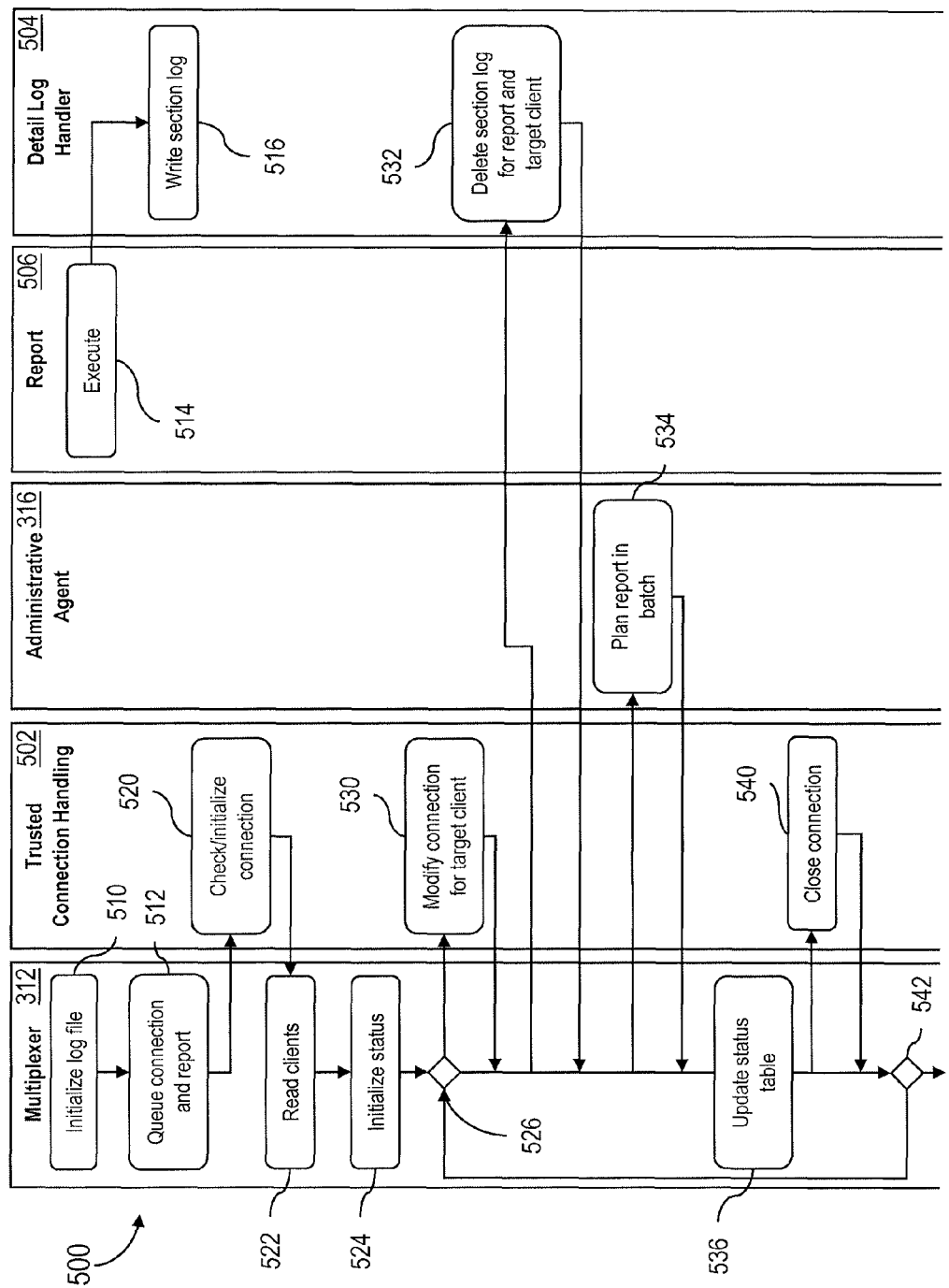
FIG. 5 and FIG. 6 show a first part and a second part, respectively, of a function call sequence diagram.
Figure 6:
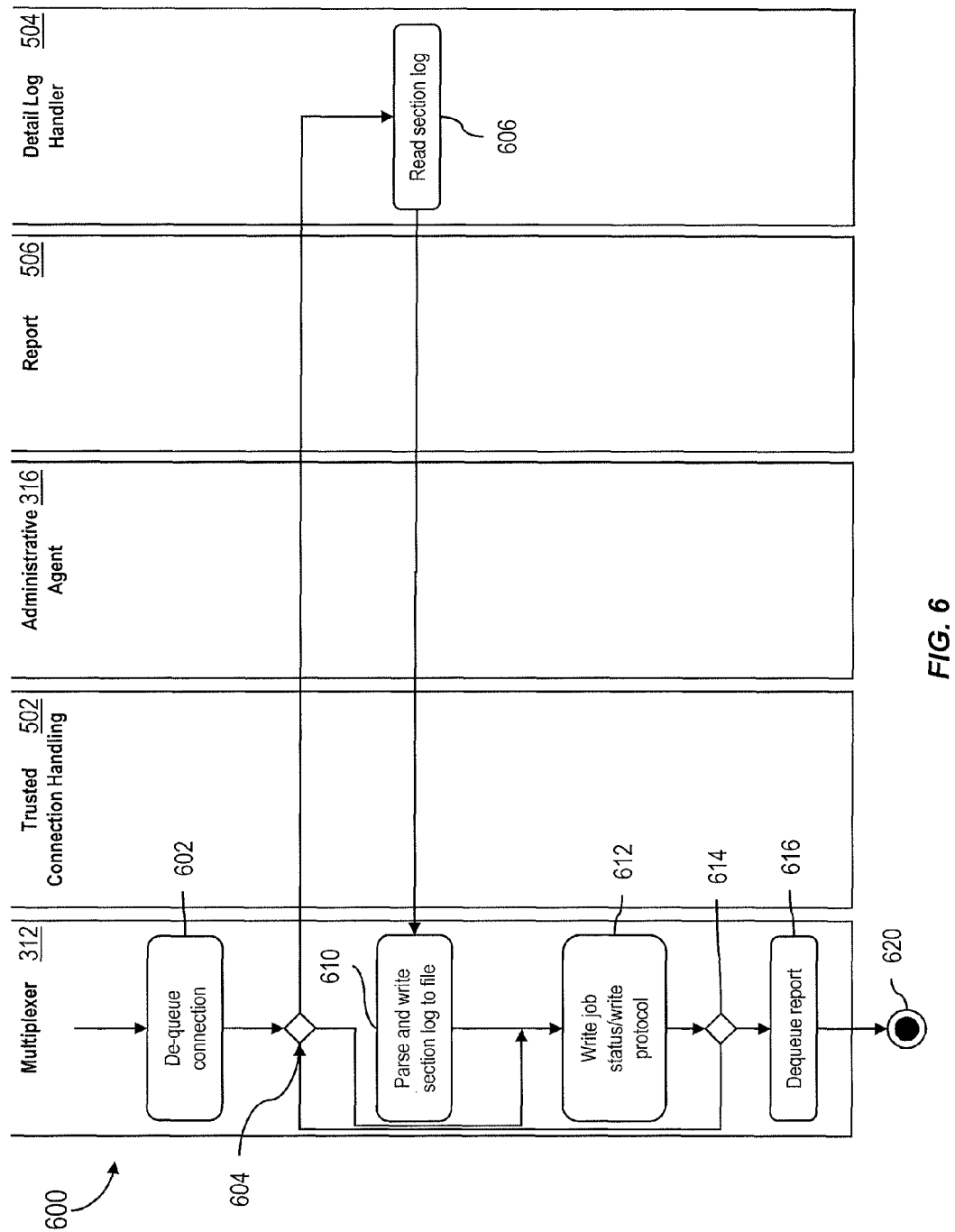

FIG. 5 and FIG. 6 show two parts 500 and 600 of a function call sequence diagram for an example implementation of the current subject matter. Calls are exchanged between the multiplexer 312, a trusted connection handler 502 to each client agent 322, and the administrative agent 316, and a detail log handler 504. In the example shown in FIG. 5 and FIG. 6, the action framework includes a report 506. At 510, a log file is initialized in the multiplexer 312 and at 512 the multiplexer 312 queues the trusted connection 502 and the report 506, which is executed at 514 to cause the detail log handler 504 to write a section log at 516. The trusted connection handler 502 checks and/or initializes connections to the client tenant agents 322 at 520, and the multiplexer reads the client information at 522 and initializes a status of the client tenant agents 322 at 524. If a connection for a target client needs to be modified (decision point at 526), the trusted connection handler 502 does so at 530. At 532, the detail log handler can delete a section log for the report and a target client. A slot can be provided for the returning of the protocols of each report in each client tenant. This slot can be emptied before the next scheduling of this combination to avoid reading an old protocol twice. In some implementations, the actions at 532 can occur prior to execution of the report 514 in the tenant. The execution of the report 514 in the tenant can occur any time subsequent to planning of a report in batch mode 534, which is discussed below.

The administrative agent 316 can plan a report in batch mode for each target client tenant at 534. The multiplexer 312 updates a status table at 536, and the connection to the target client tenant is closed by the trusted connection handler 502 at 540. At 542, the multiplexer determines if there are more client tenants for which the connection requires modification, and if so, the appropriate process actions are repeated. If not, at 602 in FIG. 6 the connection is dequeued, and a check is performed at 604 to determine whether all jobs of the action framework have been completed, for example by reading the section log in the detail log handler 504 at 606. If so, the section log file is parsed and written to a file by the multiplexer 312 at 610. If at 604 the job is determined to be "broken" or otherwise results in an error, at 612 the job status and protocol are written to file by the multiplexer 312. A check for remaining open jobs is performed at 614, and if open jobs exist, the appropriate process actions are repeated. If no open jobs remain, the report 506 is dequeued at 616, and the process ends at 620.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively; remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one processor, cause the at least one processor to perform operations comprising:

acquiring, by a tenant multiplexer in an administrative tenant of a multi-tenant system, an action framework and a trusted connection protocol for accessing each of the plurality of client tenants in the multi-tenant system, the multi-tenant system comprising an application server and a data repository and providing access to specific client tenants of the plurality of client tenants for each of a plurality of organizations;

establishing, by the tenant multiplexer using the trusted connection protocol without tenant-specific authentication information, a trusted system connection to an update agent in a client of the plurality of client tenants; and implementing, using the update agent under control of the multiplexer via the trusted system connection, the action framework to begin execution of a software process for the client.

2. A computer program product as in claim 1, wherein each of the plurality of client tenants comprises a customizable, organization-specific version of a core software platform, and the data repository comprises core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

3. A computer program product as in claim 2, wherein the action framework comprises a change to at least one of the core software platform content and the format of the system content.

4. A computer program product as in claim 3, wherein the operations further comprise propagating, for at least one of the plurality of client tenants, a dependency-driven modification to at least one of the system content data, the tenant-specific content formats, or the tenant-specific content data for the at least one of the plurality of client tenants, the dependency-driven modification resulting from the modification of at least one of the core software platform content and the format of the system content.

5. A computer program product as in claim 4, wherein the operations further comprise identifying the dependency-driven modification by accessing a listing of dependencies stored in a dependency repository accessible to the application server.

6. A computer program product as in claim 1, wherein the action framework comprises a report to be executed for at least a subset of the plurality of client tenants.

7. A computer program product as in claim 1, wherein the administrative tenant comprises a monitoring program that supervises execution of at least one batch job defined by the action framework.

8. A system comprising:
computer hardware configured to perform operations comprising:
acquiring, by a tenant multiplexer in an administrative tenant of a multi-tenant system, an action framework and a trusted connection protocol for accessing each of the plurality of client tenants in the multi-tenant system, the multi-tenant system comprising an application server and a data repository and providing access to specific client tenants of the plurality of client tenants for each of a plurality of organizations;

establishing, by the tenant multiplexer using the trusted connection protocol without tenant-specific authentication information, a trusted system connection to an update agent in a client of the plurality of client tenants; and implementing, using the update agent under control of the multiplexer via the trusted system connection, the action framework to begin execution of a software process for the client.

9. A system as in claim 8, wherein each of the plurality of client tenants comprises a customizable, organization-specific version of a core software platform, and the data repository comprises core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

10. A system as in claim 9, wherein the action framework comprises a change to at least one of the core software platform content and the format of the system content.

11. A system as in claim 10, wherein the operations further comprise propagating, for at least one of the plurality of client tenants, a dependency-driven modification to at least one of the system content data, the tenant-specific content formats, or the tenant-specific content data for the at least one of the plurality of client tenants, the dependency-driven modification resulting from the modification of at least one of the core software platform content and the format of the system content.

12. A system as in claim 11, wherein the operations further comprise identifying the dependency-driven modification by accessing a listing of dependencies stored in a dependency repository accessible to the application server.

13. A system as in claim 8, wherein the action framework comprises a report to be executed for at least a subset of the plurality of client tenants.

14. A system as in claim 8, wherein the administrative tenant comprises a monitoring program that supervises execution of at least one batch job defined by the action framework.

15. A computer-implemented method comprising:
acquiring, by a tenant multiplexer in an administrative tenant of a multi-tenant system, an action framework and a trusted connection protocol for accessing each of the plurality of client tenants in the multi-tenant system, the multi-tenant system comprising an application server and a data repository and providing access to specific client tenants of the plurality of client tenants for each of a plurality of organizations;

establishing, by the tenant multiplexer using the trusted connection protocol without tenant-specific authentication information, a trusted system connection to an update agent in a client of the plurality of client tenants; and implementing, using the update agent under control of the multiplexer via the trusted system connection, the action framework to begin execution of a software process for the client.

16. A computer-implemented method as in claim 15, wherein each of the plurality of client tenants comprises a customizable, organization-specific version of a core software platform, and the data repository comprises core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

17. A computer-implemented method as in claim 16, wherein the action framework comprises a change to at least one of the core software platform content and the format of the system content.

18. A computer-implemented method as in claim 17, further comprising propagating, for at least one of the plurality of client tenants, a dependency-driven modification to at least one of the system content data, the tenant-specific content formats, or the tenant-specific content data for the at least one of the plurality of client tenants, the dependency-driven modification resulting from the modification of at least one of the core software platform content and the format of the system content.

19. A computer-implemented method as in claim 18, further comprising identifying the dependency-driven modification by accessing a listing of dependencies stored in a dependency repository accessible to the application server.

20. A computer-implemented method as in claim 15, wherein the action framework comprises at least one of a report to be executed for at least a subset of the plurality of client tenants and a batch job whose execution is supervised by a monitoring program in the administrative tenant.

* * * * *